(12) United States Patent
Argentine (10) Patent No.: US 12,263,542 B2
(45) Date of Patent: Apr. 1, 2025

(54) METAL CARBIDE/NITRIDE PRECIPITATION CONTROL IN FUSION WELDING

(71) Applicant: BWXT Nuclear Operations Group, Inc., Lynchburg, VA (US)

(72) Inventor: Frank A. Argentine, Copley, OH (US)

(73) Assignee: BWXT Nuclear Operations Group, Inc., Lynchburg, VA (US)

( * ) Notice: Subject to any disclaimer, the term of this patent is extended or adjusted under 35 U.S.C. 154(b) by 208 days.

(21) Appl. No.: 17/847,715

(22) Filed: Jun. 23, 2022

(65) Prior Publication Data

US 2022/0324066 A1    Oct. 13, 2022

Related U.S. Application Data

(62) Division of application No. 16/702,775, filed on Dec. 4, 2019, now Pat. No. 11,413,710, which is a division
(Continued)

(51) Int. Cl.
*B23K 35/00*    (2006.01)
*B23K 9/028*    (2006.01)
(Continued)

(52) U.S. Cl.
CPC .......... *B23K 35/304* (2013.01); *B23K 9/0286* (2013.01); *B23K 9/167* (2013.01);
(Continued)

(58) Field of Classification Search
CPC .............. B23K 35/004; B23K 35/0261; B23K 35/3066; B23K 35/30; B23K 35/304;
(Continued)

(56) References Cited

U.S. PATENT DOCUMENTS 3,066,215 A    11/1962   Espy
4,525,620 A    6/1985   Deverell et al.
(Continued)

FOREIGN PATENT DOCUMENTS

CN    1562552 A    1/2005
CN    101249591 A    8/2008
(Continued)

OTHER PUBLICATIONS

Office Action issued on Apr. 28, 2023 in European Application No. 17757087.6.
(Continued)

*Primary Examiner* — Erin B Saad
(74) *Attorney, Agent, or Firm* — Morgan, Lewis & Bockius LLP (57) ABSTRACT

Properties and performance of weld material between metals in a weldment is controlled by modifying one or more of the nitrogen content and the carbon content to produce carbide (e.g. MC-type), nitride and/or complex carbide/nitride (e.g. MX-type) type precipitates. Fusion welding includes (i) adjusting shield gas composition to increase nitrogen/carbon gas and nitride/carbide species, (ii) adjusting composition of nitrogen/carbon in materials that participate in molten welding processes, (iii) direct addition of nitrides/carbides (e.g. powder form), controlled addition of nitride/carbide forming elements (e.g. Ti, Al), or addition of elements that increase/impede solubility of nitrogen/carbon or nitride/carbide promoting elements (e.g. Mn), and (iv) other processes, such as use of fluxes and additive materials. Weld materials have improved resistance to different cracking mechanisms (e.g., hot cracking mechanisms and solid state cracking mechanisms) and improved tensile related mechanical properties.

16 Claims, 6 Drawing Sheets

Related U.S. Application Data of application No. 15/437,901, filed on Feb. 21, 2017, now Pat. No. 10,543,570.

(60) Provisional application No. 62/298,358, filed on Feb. 22, 2016.

(51) Int. Cl.

| | | |
|---|---|---|
| *B23K 9/167* | (2006.01) | |
| *B23K 9/173* | (2006.01) | |
| *B23K 9/23* | (2006.01) | |
| *B23K 35/30* | (2006.01) | |
| *B23K 35/38* | (2006.01) | |
| *C22C 19/05* | (2006.01) | |
| *F16B 5/08* | (2006.01) | |
| *B23K 103/18* | (2006.01) | |

(52) U.S. Cl.
CPC .............. *B23K 9/173* (2013.01); *B23K 9/23* (2013.01); *B23K 35/383* (2013.01); *C22C 19/055* (2013.01); *C22C 19/056* (2013.01); *C22C 19/058* (2013.01); *F16B 5/08* (2013.01); *B23K 2103/18* (2018.08)

(58) Field of Classification Search
CPC ................ B23K 35/3073; B23K 35/3086; B23K 35/40; B23K 9/173
See application file for complete search history.

(56) References Cited

U.S. PATENT DOCUMENTS

| | | | | |
|---|---|---|---|---|
| 5,744,782 A | * | 4/1998 | Sampath | B23K 35/3066 219/146.1 |
| 6,300,596 B1 | * | 10/2001 | Bonnet | B23K 9/173 219/146.1 |
| 2002/0011287 A1 | | 1/2002 | Nishimoto et al. | |
| 2010/0032414 A1 | | 2/2010 | Arjakine et al. | |
| 2010/0136361 A1 | * | 6/2010 | Osuki | B23K 35/0261 428/615 |
| 2014/0186101 A1 | | 7/2014 | Hirata et al. | |

FOREIGN PATENT DOCUMENTS

| | | |
|---|---|---|
| EP | 2 671 669 A1 | 12/2013 |
| JP | S59-223197 A | 12/1984 |
| JP | S61-020668 A | 1/1986 |
| JP | 62-224481 A | 10/1987 |
| JP | S63-194892 A | 8/1988 |
| JP | 06-198488 A | 7/1994 |
| JP | H07-83951 B2 | 9/1995 |
| JP | H08-174271 A | 7/1996 |
| JP | 2013-208627 A | 10/2013 |
| JP | 2016-000414 A | 1/2016 |
| WO | 97/32684 A1 | 9/1997 |
| WO | 2008/116478 A1 | 10/2008 |
| WO | 2012/113019 A1 | 8/2012 |

OTHER PUBLICATIONS

Alexandrov et al., "Use of the cast pin tear test to study solidification cracking", Weld World (2013) 57:635-648.
Extended European Search Report issued in corresponding European Patent Application No. 17757087.6, dated Jan. 18, 2019.
Search and Examination Report dated Jun. 1, 2019, issued in corresponding Australian Patent Application No. 2017223410.
International Preliminary Report on Patentability dated Aug. 28, 2018, issued in corresponding International Application No. PCT/US2017/018776.
International Search Report and Written Opinion dated May 4, 2017, issued in corresponding International Application No. PCT/US2017/018776.
Japanese Office Action dated Dec. 10, 2019 issued in corresponding Japanese Patent Application No. 2018-563392 (with English summary).
Office Action dated Feb. 11, 2020 issued in European Patent Application No. 17757087.6.

* cited by examiner

METAL CARBIDE/NITRIDE PRECIPITATION CONTROL IN FUSION WELDING

RELATED APPLICATION DATA

This application is a divisional application of U.S. patent application Ser. No. 16/702,775 filed Dec. 4, 2019, which is a divisional application of U.S. patent application Ser. No. 15/437,901 filed Feb. 21, 2017, and is based on and claims priority to U.S. Application No. 62/298,358, filed Feb. 22, 2016, the entire contents of which are incorporated herein by reference.

This invention was made with support under a subcontract awarded by a contractor to the federal government. The U.S. government has certain rights in the invention.

FIELD OF THE DISCLOSURE

The present disclosure relates to welding materials and methods of welding and the resulting properties of weld materials. More specifically, the present disclosure relates to controlling precipitates, particularly carbide (e.g. MC-type), nitride (e.g. MN-type) and/or complex carbide/nitride (e.g. MX-type) type precipitates, in weld material joining bodies, through the control of one or more of nitrogen content and carbon content in the weld fabrication process, particularly when the weld fabrication process uses ERNiCr-3 (filler metal 82) as the weld metal joining dissimilar metals via welding. The disclosed welding materials and methods of welding also extend to joining of similar metals via welding as well as to other processes and structures associated with overlays, buttering or cladding of non-corrosion resistant base materials with corrosion resistant weld metals. The present disclosure can also be extended to composition and precipitate control in base materials, per se.

BACKGROUND

In the discussion that follows, reference is made to certain structures and/or methods. However, the following references should not be construed as an admission that these structures and/or methods constitute prior art. Applicants expressly reserve the right to demonstrate that such structures and/or methods do not qualify as prior art against the present invention.

Materials have chemical, microstructural, and mechanical properties that are a function of composition and processing. While materials will have a composition within specified ranges and/or have a specified processing method, the specification does not always state or put limits on specific interstitial constituents (such as C or N) or specific processes that influence every desired property of the material. Furthermore, even when a material is within a specification, there is source-to-source and heat-to-heat variability in the composition of the material, which may lead to variability in properties to be outside of acceptable limits and/or tolerance bands.

This variability applies, for example, to the materials and methods used in welding. As an example, ERNiCr-3 (a grade of welding wire also known as Filler Metal 82) is widely used for joining dissimilar metals via fusion welding and is commonly found in, for example, the nuclear power industry for dissimilar metal welds in pressurized water reactor components. ERNiCr-3 can be sourced from various manufactures and, while ERNiCr-3 from each manufacturer will be compositional within specification, the material specifications and manufacturing methods for these materials do not control nitrogen content or nitride formation except through the control of bulk concentrations of constituent elements and there is variability in material content and material performance due to localized variability in composition whereby the ERNiCr-3 material still exhibits a wide range of chemical, microstructural, and mechanical properties.

These unspecified compositional variations can impact the performance of the weld material joining the two metallic bodies forming a weldment, as well as the weldment overall. For example, variations in constituents not covered by the specification alone or in combination with narrower ranges for constituents covered by the specification for various fusion welding processes and materials can influence formation of precipitates within inter-dendritic and inter-granular sites of the weld microstructure and can have an influence on the material properties (among other things, weld crack susceptibility) and result in performance variability.

SUMMARY

Generally, Applicants have investigated the above-discussed variations and their effect on composition-structure-property relationships in fusion welding and propose solutions applying these relationships to improvements in fusion welding processes and materials with attendant improvements in performance of weld materials joining the two metallic bodies forming a weldment, as well as the weldment overall and other processes and structures associated with, for example, overlays, buttering or cladding of non-corrosion resistant base materials with corrosion resistant weld metals. In particular, Applicants have observed that variability in material content and performance among weld materials, such as those formed using ERNiCr-3 materials, often relates to the nitrogen content and the carbon content, which influences metal carbide type (MC-type), nitride (e.g. MN-type), and/or complex carbide/nitride type (e.g. MX-type) precipitation. It has been determined that early formation and presence of high temperature nitrides have a prominent effect on the volume (via enhanced nucleation) and morphology of carbide or nitride type phases and the properties/characteristics of accompanying primary/secondary phases within both partially- and fully-solidified materials and in both ferrous and non-ferrous materials. Relatedly, control of nitrogen and/or carbon content, in particular the amount of high temperature nitride available during joining, such as by welding, and/or carbide formation within weld material can provide a method to regulate carbide/nitride precipitation and growth and desired material effect(s). Thus, Applicants have developed weld materials and processes for fusion welding that modifies one or more of the nitrogen content and carbon content and precipitates in weld materials by one or more of the following: (i) adjusting the shield gas composition to increase nitrogen gas and nitride species, (ii) adjusting the shield gas composition to decrease nitrogen gas and nitride species, (iii) adjusting the composition of nitrogen, nitride forming and nitride solubilizing constituents in the materials to obtain a desired concentration of nitrogen and nitrides, and (iv) using other processes, such as use of fluxes and filler materials, to introduce nitrogen or nitrides to the molten metal forming the weld material, overlay, buttering or cladding, (v) adjusting the shield gas composition to increase carbon gas and carbide species, (vi) adjusting the shield gas composition to decrease carbon gas and carbide species, (vii) adjusting the composition of carbon, carbide forming and carbide solubilizing constituents in the materials to obtain a desired concentration of carbon and carbides, and (viii) using other processes, such as use of fluxes and filler materials, to introduce carbon or carbides to the molten metal forming the weld material, overlay, buttering or cladding.

In general, exemplary embodiments of a weldment comprises a first metallic body and a second metallic body joined by a weld material, wherein the weld material has a composition including 18.0 to 22.0 wt. % Cr, 2.5 to 3.5 wt. % Mn, up to 3.0 wt. % Fe, 15 ppm to 120 ppm or 200 ppm to 1500 ppm N, and equal to or greater than 67 wt. % Ni. Alternatively, the weld material has a composition including 18.0 to 22.0 wt. % Cr, 2.5 to 3.5 wt. % Mn, up to 3.0 wt. % Fe, 100 ppm to 500 ppm N, 0.03 to 0.06 wt. % C, and equal to or greater than 67 wt. % Ni. Further alternatively, the weld material has a composition including 18.0 to 22.0 wt. % Cr, 2.5 to 3.5 wt. % Mn, up to 3.0 wt. % Fe, up to 250 ppm N, up to 0.040 wt. % C, and equal to or greater than 67 wt. %. In each of the above embodiments, other elements may be present as follows: Nb+Ta 2.0 to 3.0 wt. %, max 0.75 wt. % Ti, and other elements (total) max 0.50 wt. %. In the case of overlays and cladding, exemplary embodiments may utilize one metallic body, and may utilize a second metallic body that is a base material component or a weld deposit. In further embodiments, the weldment can include multiple base material components and one or multiple weld material components.

An exemplary method of fusion welding comprises forming a region of molten material between a first metallic body and a second metallic body, wherein the molten material includes molten base metal from the first metallic body, molten base metal from the second metallic body, weld metal from a welding alloy, and, optionally, one or more molten additive material, modifying at least one of a nitrogen content of the molten material and a nitride content of the molten material, coalescing the molten material, and solidifying the molten material to form a weld material, wherein the solidified weld material joins the first metallic body to the second metallic body to form a weldment, and wherein the solidified weld material has a composition including 15 ppm to 120 ppm or 200 ppm to 1500 ppm nitrogen. In an alternative embodiment, at least one of a nitrogen or carbon content of the molten material and a nitride or carbide content of the molten material is modified and the solidified weld material has a composition including one or more of 100 ppm to 500 ppm N and up to 0.06 wt. % C (preferably, 0.03 to 0.06 wt. % C). In a further alternative embodiment, the solidified weld material has a composition including one or more of up to 250 ppm N and up to 0.040 wt. % C.

Also, in exemplary embodiments, a microstructure of the weld material includes a plurality of precipitates, wherein the plurality of precipitates include one or more of a plurality of metal carbide precipitates and a plurality of metal carbide/nitride precipitates. In exemplary embodiments, a volume fraction of the plurality of precipitates is 0.0025 or less for nitrogen in the range of 15 ppm to 120 ppm (alternately, 0.0018 or less for nitrogen in the range of 15 ppm to 100 ppm) and is 0.003 or more for nitrogen in the range of 200 ppm to 1500 ppm (alternately at or above 0.010, alternatively from 0.010 to 0.0175, for nitrogen in the range of greater than 1000 ppm, alternatively from 1000 ppm to 1300 ppm) The above precipitate volume fractions were observed for ERNiCr-3/EN82 wire with a fixed carbon content of nominally 0.05 wt. % (for example ranging from 0.050 to 0.055 as reported in Table 2). In other exemplary embodiments, the volume fraction of the plurality of precipitates is 0.0025 to 0.0077 for nitrogen in the range of 100 ppm to 500 ppm and 0.03 to 0.05 wt. % C, alternately, 0.0025 to 0.0060 for nitrogen in the range of 125 ppm to 350 ppm in combination with 0.030 wt. % C and 0.0060 to 0.0077 for nitrogen in the range of 200 ppm to 310 ppm in combination with 0.05 wt. % C. In this embodiment, precipitate volume fractions were observed for two different samples of ERNiCr-3/EN82 wire each with a fixed carbon content of, in one case nominally 0.05 wt. % (for example ranging from 0.051 to 0.055 as reported in Table 5) and in a second case nominally 0.03 wt. % (for example ranging from 0.027 to 0.030 as reported in Table 5).

All values used in the discussion of embodiments herein are reported as nominal (whether or not that term is used in the text) and all values in examples and tests are reported as actual.

BRIEF DESCRIPTION OF THE DRAWING

The following detailed description of preferred embodiments can be read in connection with the accompanying drawings in which like numerals designate like elements and in which.

DETAILED DESCRIPTION

Fusion welding joins a first metallic body to a second metallic body to form a weldment. Because metals must be heated to the melting point for fusion welds to be produced, the first metallic body and the second metallic body are sufficiently heated to form molten base material from each and, with any added material such as weld wire and filler material, to form a region of molten material. The region of molten material coalesces by which the different molten constituents mix together to form a molten mass. There is often a high degree of homogeneity among the component metals that have been melted, but localized compositional variation can occur. The coalescence typically occurs by convection, but oscillation and even evaporation can also play a role. The coalesced molten region then solidifies to form weld material that joins the first metallic body to the second metallic body to form the weldment.

Figure 1A:
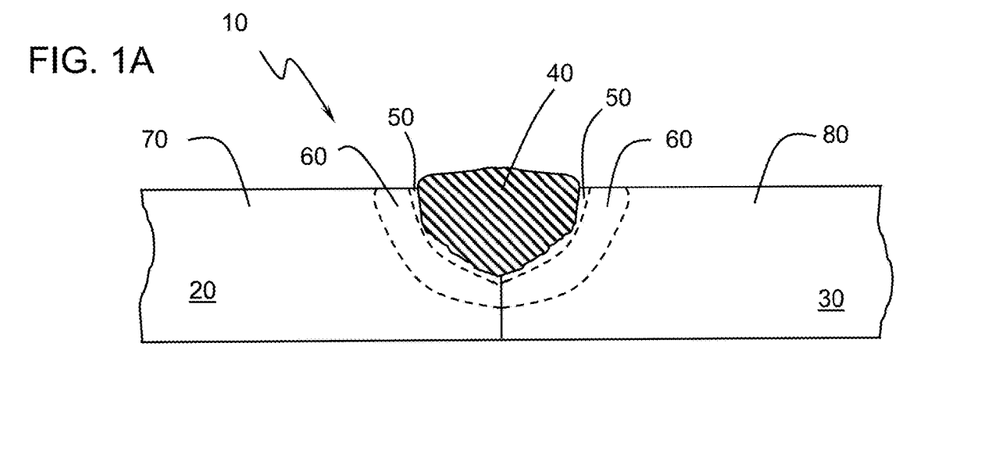
FIG. 1A is a schematic cross-sectional side view of an exemplary embodiment of a weldment showing the weld material and certain zones within the weldment.

FIG. 1A shows a simplified schematic cross-section of a portion of a weldment 10 at the fusion weld joint. The weldment comprises a first metallic body 20 and a second metallic body 30 joined by a weld material 40. The weld material 40 is a mixture of base materials from the first metallic body 20 and the second metallic body 30 that have completely melted and any added material such as weld wire and filler material. At a distance from and outside the weld material 40 and separated therefrom by an interface/partially melted zone 50, there is a heat affected zone (HAZ) 60. The heat affected zone is a volume of material in the first metallic body 20 and in the second metallic body 30 in which the base metal, while not melted, still has had its microstructural or mechanical properties altered by high temperature heat from the welding process. At a further distance from the weld material 40 and outside the heat affected zone 60, the base metal of the first metallic body 20 and the second metallic body 30 is essentially unaffected. In the illustrated portion of weldment 10, the regions in the metallic bodies 20, 30 where the base metal is essentially unaffected are indicated by 70 and 80, respectively.

Figure 1B:
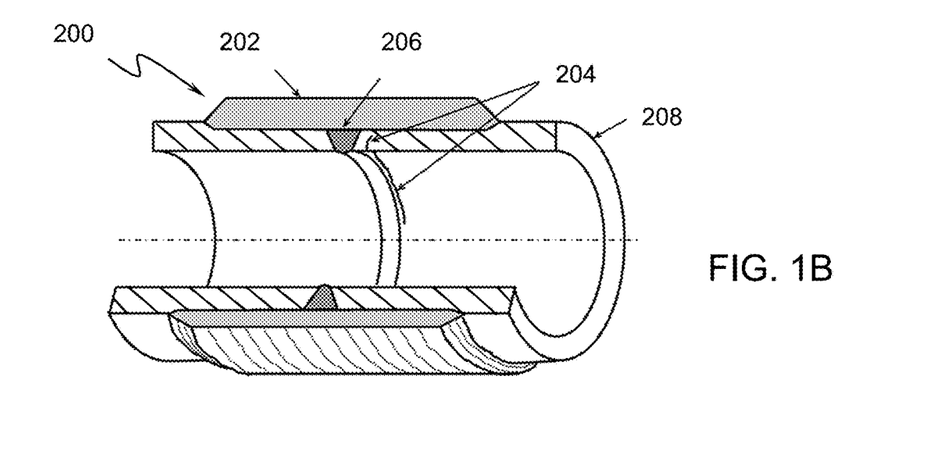
FIG. 1B a schematic cross-sectional side view of an exemplary embodiment of a weld overlay.
Figure 1C:
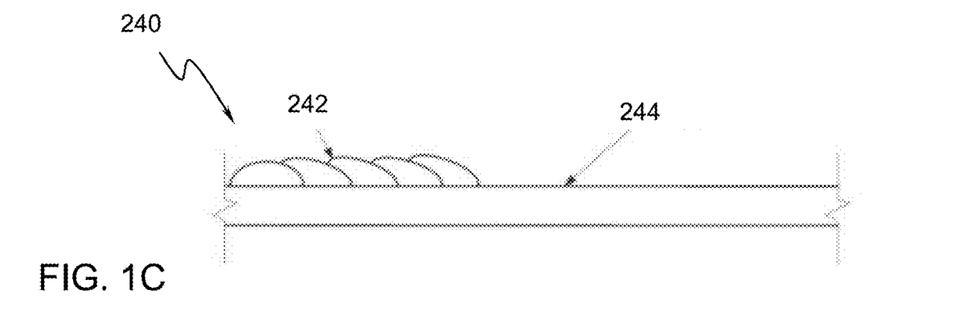
FIG. 1C a schematic cross-sectional side view of an exemplary embodiment of weld buttering.

The disclosed fusion welding also extends to other applications, such as weld overlay, buttering, and cladding. FIG. 1B shows a simplified schematic cross-section of a portion of a weld overlay. The weld overlay 200 applies one or more metals with specific characteristics to a base metal or base structure to improve desirable properties or to restore the original dimension of the component. As shown in FIG. 1B, the weld overlay 200 comprises a weld overlay material 202 to a base structure 204 (in FIG. 1B, the base structure is a pipe). A weld material 206 is located at a joint or contact point between two sections of the base material 204 and the weld material 202 extends along a surface of the base structure 204 past a defect 208 (in FIG. 1B, the defect is a crack). FIG. 1C shows a simplified schematic cross-section of a portion of weld buttering 240, in which a layer of weld metal 242 has been sequentially applied over a base metal 244 to form multiple layers of weld metal. Although FIG. 1C illustrates weld deposits applied parallel to the weldment surface, weld deposits may also be applied perpendicular to the weldment surface.

In exemplary embodiments, the weld material 40, 206, 242 (and optionally the weld overlay material 202) is based on ERNiCr-3 weld metal. ERNiCr-3 weld metal provides excellent corrosion resistance and high temperature mechanical properties while providing a means to bridge the differences in coefficient of thermal expansion between the first metallic body and the second metallic body when using dissimilar metals, such as ferritic and austenitic materials. Although ERNiCr-3 weld metal is generally considered to be resistant to mechanical flaws and defects such as solidification cracking, solidification cracking has been observed in high restraint situations. Examples of high restraint situations include thick section weld deposits, highly restrained metallic bodies, and metallic bodies with high yield strength. Furthermore, it has been observed that considerable heat-to-heat variability in susceptibility to solidification cracking occurs despite only slight variations in chemical composition within the specification range of conventional ERNiCr-3 weld metal. One test by which such solidification cracking can be observed and compared between samples is the cast pin tear test (CPTT), which is disclosed and described in T. Alexandrov, et al., "Use of the cast pin tear test to study solidification cracking", *Weld World* (2013) 57:635-648, the entire contents of which is incorporated herein by reference.

One or more of the nitrogen content and the carbon content and the precipitate properties (number, size and/or distribution) of the weld material influence the material strength of the weld material as well as certain types of crack resistance of the weld material. Applicants have determined that control of nitrogen and nitride content in the weld material can be achieved by control of nitrogen sources and nitride sources to the weld environment and can be used to achieve desired properties in the weld material, including a reduction in certain cracking susceptibility and improved mechanical strength. Similarly, control of carbon and carbon content in the weld material can be achieved by control of carbon sources and carbide sources to the weld environment and can be used to achieve desired properties in the weld material, including a reduction in certain cracking suscep-tibility and improved mechanical strength. Additionally, combining both nitrogen and carbon control can be used to achieve such desirable properties.

For example, in a first embodiment, a range of 15 ppm to 120 ppm nitrogen appears to provide resistance to hot cracking mechanisms, such as solidification cracking, while heats with nitrogen content of 150 ppm to 250 ppm appear to be more susceptible. Conversely, higher nitrogen contents in the range of 200 ppm to 1500 ppm appear to improve mechanical strength and promote resistance to solid state crack mechanisms such as ductility dip cracking (DDC).

Nitrogen content in the range of 15 ppm to 120 ppm, alternatively 20 ppm to 100 ppm and a low volume fraction of precipitates (e.g., less than 0.005) have little impact on mechanical properties such as tensile strength and 0.2% yield strength, and improves resistance of the weld material to hot cracking mechanisms, such as solidification cracking. Also, nitrogen content in the range of 200 ppm to 1500 ppm, alternatively 600 ppm to 1300 ppm and a high volume fraction of precipitates (e.g., more than 0.01, alternatively, 0.01 to 0.0175) increases mechanical properties of the weld material such as tensile strength and 0.2% yield strength, and improves resistance of the weld material to solid state cracking mechanisms, such as ductility dip cracking.

Considering the above, a specific embodiment of a weld material has a composition that includes nitrogen content in a range of 15 ppm to 120 ppm or in the range of 200 ppm to 1500 ppm. In addition, a microstructure of the weld material includes one or more of a plurality of metal carbide precipitates and a plurality of metal carbide/nitride precipitates. When the nitrogen content is in the range of 15 ppm to 120 ppm, the microstructure of the weld material includes a plurality of precipitates having a volume fraction of 0.0025 or less; when the nitrogen content is in the range of 200 ppm to 1500 ppm, the microstructure of the weld material includes a plurality of precipitates having a volume fraction of 0.003 or more. The volume fraction of precipitates can be determined by quantitative image analysis with SEM (as discussed further below).

Also for example, in a second embodiment, one or more of 100 ppm to 500 ppm N and up to 0.06 wt. % C (preferably, 0.03 to 0.06 wt. % C) provides improvement in mechanical performance. More particularly, a range of up to 250 ppm N in combination with a range of up to 0.040 wt. % C provides resistance to hot cracking mechanisms, such as solidification cracking. Conversely, a range of 100 ppm to 500 ppm N in combination with a range of 0.03 wt. % C to 0.06 wt. % C improves mechanical strength and promotes resistance to solid state crack mechanisms such as ductility dip cracking (DDC).

The following Table 1 summarizes compositions of ERNiCr-3 weld material where the carbon content and the nitrogen content are controlled to obtain the specified compositions and with attendant effects on hot cracking mechanisms, such as solidification cracking and solid state crack mechanisms such as ductility dip cracking (DDC).

TABLE 1

| Constituent | Composition for improved solidification crack resistance | | Composition for improved ductility dip cracking resistance (DDC) | |
| --- | --- | --- | --- | --- |
| | Min | Max | Min | Max |
| C | — | 0.040 | 0.03 | 0.06 |
| Cr | 18 | 22 | 18 | 22 |
| Fe | — | 3.00 | — | 3.00 |

TABLE 1-continued

| Constituent | Composition for improved solidification crack resistance | | Composition for improved ductility dip cracking resistance (DDC) | |
|---|---|---|---|---|
| | Min | Max | Min | Max |
| Mn | 2.50 | 3.50 | 2.50 | 3.50 |
| N | — | 0.0250 | 0.0100 | 0.0500 |
| Nb + Ta | 2.0 | 3.0 | 2.0 | 3.0 |
| Ni | 67.0 | — | 67.0 | — |
| Ti | — | 0.75 | — | 0.75 |
| Other Elements (Total) | — | 0.500 | — | 0.500 |

Considering the above, a specific embodiment of a weld material has a composition that includes nitrogen content in a range of up to 250 ppm nitrogen in combination with carbon content in a range of up to 0.040 wt. % C. In addition, a microstructure of this weld material includes one or more of a plurality of metal carbide precipitates and a plurality of metal carbide/nitride precipitates. In particular, the microstructure of this weld material includes a plurality of precipitates having a volume fraction of about 0.0025. Another specific embodiment of a weld material has a composition that includes nitrogen content in a range of 100 ppm to 500 ppm nitrogen in combination with carbon content in a range of 0.03 wt. % C to 0.06 wt. % C. In addition, a microstructure of this weld material includes one or more of a plurality of metal carbide precipitates and a plurality of metal carbide/nitride precipitates. In particular, the microstructure of this weld material includes a plurality of precipitates having a volume fraction of plurality of precipitates of 0.0025 to 0.0077 for nitrogen in the range of 100 ppm to 500 ppm and 0.03 to 0.05 wt. % C, alternately, 0.0025 to 0.0060 for nitrogen in the range of 125 ppm to 350 ppm in combination with 0.030 wt. % C and 0.0060 to 0.0077 for nitrogen in the range of 200 ppm to 310 ppm in combination with 0.05 wt. % C. The volume fraction of precipitates can be determined by quantitative image analysis with SEM (as discussed further below) and provides a metric to correlate with the known resistance to hot cracking mechanisms, such as solidification cracking, in high restraint applications.

Figure 2:
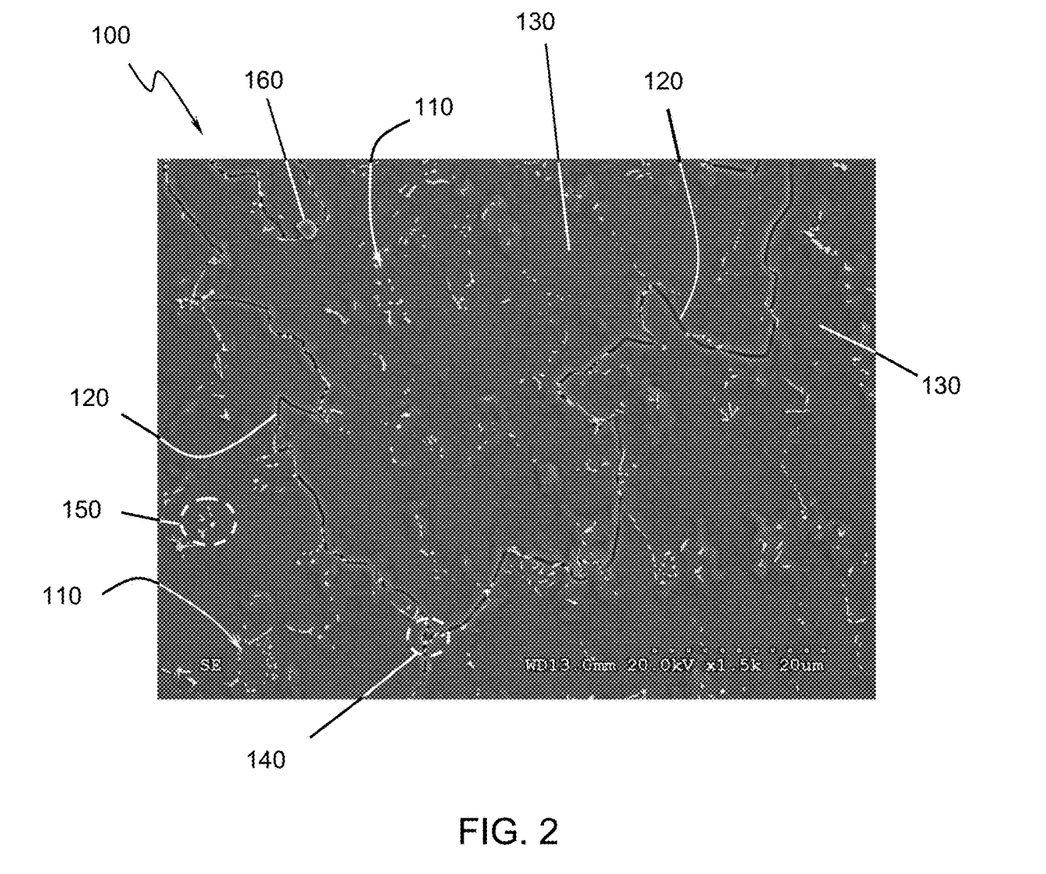
FIG. 2 is a scanning electron microscope image of an ERNiCr-3 weld material prepared using a shield gas of 95 mol. % argon and 5 mol. % nitrogen.

FIG. 2 is a scanning electron microscope image of an ERNiCr-3 weld material prepared using a shield gas of 95 mol. % argon and 5 mol. % nitrogen. The ERNiCr-3 weld material in FIG. 2 had a nitrogen content of 1300 PPM. In the FIG. 2 image 100, the light or white areas 110 are carbide (e.g. MC-type) and complex carbide/nitride (e.g. MX-type) type precipitates. The black lines 120 in the micrograph are grain boundaries. The image 100 was taken at 20.0 kv and 1500× magnification. Using quantitative image analysis and taking the average of measurements from fifteen SEM micrographs (all from the same orthogonal plane of the sample and using the same weld process and consistent imaging and quantification settings), the volume fraction of precipitates for the sample shown in the image 100 in FIG. 2 was determined to be 0.0175. Other features visible in FIG. 2 include gamma phase (i.e. austenite) 130, small MC/MX phase particles (inter-granular) 140, small MC/MX phase particles (inter-dendritic) 150, and large MN/MX phase particles 160.

The amount of precipitates in the weld material can be influenced by the presence and amount of nitride and carbide forming constituents. Dominate carbide or nitride forming constituents for ERNiCR-3 are niobium and titanium. Niobium is the primary carbide forming element in ERNiCr-3. The traditional phase transformation sequence for ERNiCr-3 only results in gamma phase (i.e., austenite) and NbC. Therefore, in a specific example, the composition of the weld material can include one or more of 1-4 wt. % Nb, alternatively 2-3 wt. % Nb, and up to 0.75 wt. % Ti, alternatively, 0.30 to 0.45 wt. % Ti.

In other respects, the weld material can be any weld material suitable for joining the first metallic body and the second metallic body to form a weldment. In a further specific embodiment, the first metallic body and the second metallic body are formed of similar metals or dissimilar metals (alternatively are ferrous and non-ferrous metals), and the weld material is an ERNiCr-3 based weld material.

In a first embodiment, the ERNiCr-3 based weld material has a composition that includes:
Cr 18.0 to 22.0 wt. %,
Mn 2.5 to 3.5 wt. %,
Fe 1.0 to 3.0 wt. %,
M up to 4.0 wt. %
N 15 ppm to 120 ppm or 200 ppm to 1500 ppm,
Si up to 0.25 wt. %, and
Ni equal to or greater than 67 wt. %, In a second embodiment, the ERNiCr-3 based weld material has a composition that includes:
Cr 18.0 to 22.0 wt. %,
Mn 2.5 to 3.5 wt. %,
Fe up to 3.0 wt. %,
M up to 4.0 wt. %
N 100 ppm to 500 ppm,
C 0.03 to 0.06 wt. %,
Si up to 0.25 wt. %, and
Ni equal to or greater than 67 wt. %, In a third embodiment, the ERNiCr-3 based weld material has a composition that includes:
Cr 18.0 to 22.0 wt. %,
Mn 2.5 to 3.5 wt. %,
Fe up to 3.0 wt. %,
M up to 4.0 wt. %
N up to 250 ppm,
C up to 0.040 wt. %,
Si up to 0.25 wt. %, and
Ni equal to or greater than 67 wt. %

In each of the above, M is a carbide or nitride or complex carbide/nitride forming constituent such as Nb or Ti. When Nb is present, its limit is 1-4 wt. %, alternatively, 2-3 wt. %; when Ti is present, its limit is up to 0.75 wt. %, alternatively, 0.30 to 0.45 wt. %. Nb and Ta are primary carbide forming elements in ERNiCr-3 and can be substituted for each other; when present, the traditional phase transformation sequence for ERNiCr-3 results in gamma phase and NbC and/or TaC.

Carbon can also be present in the weld composition and can contribute to the precipitate properties (number, size and/or distribution) of the weld material and has a prominent influence on precipitation volume. In the specification for ERNiCr-3 (EN82H) material, C has a range of 0.03 wt. % to 0.10 wt. %. Typical bulk composition is 0.035-0.045 wt. % C, and observations on heats with elevated carbon content (0.050-0.060 wt. % C) suggest that, while nitrides are still the primary catalyst for heterogeneous precipitation, N and C both contribute to the precipitate volume in the weld material.

Within a single weldment, specific regions can employ more or less nitrogen and/or precipitates to obtain desired properties. For example, in a weldment with a multi-layer weld deposit, different regions or layers of the weldment can have weld material with different amounts of nitrogen in the weld material composition. In regions of the weldment with a higher susceptibility to solidification cracking (which typically occurs towards the end of weld solidification), the nitrogen content of the weld material can be adjusted to be 15 ppm to 120 ppm (approximately 0.0015 wt. % to 0.012 wt. %) to provide increased resistance to solidification cracking or can be adjusted to have both nitrogen and carbon where nitrogen is present up to 250 ppm (approximately 0.025 wt. %) in combination with carbon present up to 400 ppm (approximately 0.040 wt. %). Within the same weldment but at a different layer, some regions have a lower susceptibility to solidification cracking but a higher susceptibility to solid state crack mechanisms such as ductility dip cracking (for example, regions containing migrated weld grain boundaries or insufficient MC-type carbide precipitates) and the weld material in these regions can have a composition in which the nitrogen level is adjusted to be 200 ppm to 1500 ppm, alternatively 500 ppm to 1400 ppm or 1000 ppm to 1300 ppm (approximately 0.02 wt. % to 0.15 wt. %, alternatively 0.05 wt. % to 0.14 wt. % or 0.10 wt. % to 0.13 wt. %) or can be adjusted to have both nitrogen and carbon where nitrogen is present in a range of 100 ppm to 500 ppm (approximately 0.010 wt. % to 0.050 wt. %) in combination with carbon present in a range of 300 ppm to 600 ppm (approximately 0.03 wt. % to 0.06 wt. %). It is also contemplated that in some instances, the nitrogen and/or carbon content of weld material within the same weldment but at a different layer can be unadjusted.

Without being bound to any particular theory, it is currently understood that solidification of weld material in the welding process occurs sufficiently rapidly that metal element-based (such as Nb-based) or carbon-based routes to forming carbide (e.g. MC-type), nitride and/or complex carbide/nitride (e.g. MX-type) type particulates in the weld material have only limited time to nucleate, grow and form precipitates before such precipitate forming processes are essentially stopped by the solidification of the weld material. Under these conditions, there is little to no ability to influence variations in the final precipitate properties (number, size and/or distribution) in the weld material. However, increasing the presence of nitrogen (or nitrides) in the molten weld material increases the liquidus temperature, allowing for more mobility of constituents of the weld material composition and a longer solidification process, both of which promote increased precipitate properties (number, size and/or distribution) as compared to weld material with lower amounts of nitrogen, e.g. less than about 120 ppm nitrogen. These increased precipitate properties (number, size and/or distribution) have been correlated qualitatively such that an increase in nitrogen/nitride concentrations will increase precipitate properties and a decrease in nitrogen/nitride concentrations will decrease precipitate properties.

Additionally, weld materials having low nitrogen content (15 ppm to 120 ppm) and low volume fraction of precipitates (less than 0.0025) have little to no improvement in mechanical properties as compared to weld material in which the nitrogen and precipitates have not be modified, but do display improved resistance to hot cracking mechanisms. Similarly, weld materials having high nitrogen content (200 ppm to 1500 ppm and particularly if greater than 1000 ppm) and high volume fraction of precipitates (above 0.003 and particular at or above 0.010, alternatively from 0.010 to 0.0175) have improvements in mechanical properties as compared to weld material in which the nitrogen and precipitates have not been modified, and also display improved resistance to solid state cracking mechanisms.

Turning to a method of fusion welding in which a weld material joins a first metallic body to a second metallic body to form a weldment, an exemplary method includes forming a region of molten material between a first metallic body and the second metallic body. This molten material includes molten base metal from the first metallic body, molten base metal from the second metallic body, weld metal from a welding alloy, and, optionally, one or more molten filler metals. At least one of the nitrogen and the carbon content of the molten material is modified, as discussed further below, and the molten material, coalesces, by which the different constituents of the molten base metal from the first metallic body, molten base metal from the second metallic body, weld metal from a welding alloy, and, optionally, one or more molten filler metals join together and become a mixture. The coalesced molten material then solidifies to form a weld material that has a composition, depending on the disclosed embodiment used, that includes 15 ppm to 120 ppm or 200 ppm to 1500 ppm nitrogen, or includes both nitrogen and carbon where nitrogen is present up to 250 ppm in combination with carbon present up to 0.040 wt. %, or includes both nitrogen and carbon where nitrogen is present in a range of 100 ppm to 500 ppm in combination with carbon present in a range of 0.03 wt. % to 0.06 wt. % (depending on the desired mechanical properties and desired crack resistance).

In addition, modifying the nitrogen and nitride content of the molten material modifies the microstructure of the weld material to include one or more of a plurality of metal carbide precipitates and a plurality of metal carbide/nitride precipitates. In exemplary embodiments, the microstructure of the weld material includes a plurality of NbC precipitates and/or TiN precipitates at a low volume fraction of precipitates (less than 0.0025) to improve resistance to hot cracking mechanisms or at a high volume fraction of precipitates (above 0.003 and particular at or above 0.010) to improve resistance to solid state cracking mechanisms. In alternative embodiments in which carbon and nitrogen are controlled, a volume fraction of precipitates is 0.0025 to 0.0077 for nitrogen in the range of 100 ppm to 500 ppm in combination with 0.03 to 0.05 wt. % C, alternately, the volume fraction is 0.0025 to 0.0060 for nitrogen in the range of 125 ppm to 350 ppm in combination with 0.030 wt. % C and 0.0060 to 0.0077 for nitrogen in the range of 200 ppm to 310 ppm in combination with 0.05 wt. % C.

Methods disclosed herein modify the nitrogen content and or the carbon content of the molten material by controlling the presence of nitrogen (and nitrides) and/or carbon (and carbides) in the molten weld material. Controlling the presence of nitrogen (and nitrides) and/or carbon (and carbides) in the molten weld material also influences and modifies the presence of nitrogen and carbide (e.g. MC-type) type precipitates and/or complex carbide/nitride (e.g. MX-type) type precipitates and their content in the weld material. For example, a welding process can be used which includes one or more of the following steps to modify one or more of the nitrogen content and the carbon content of the molten material: (i) the shield gas composition is adjusted to increase nitrogen gas and nitride species, (ii) the shield gas composition is adjusted to decrease nitrogen gas and nitride species, (iii) the composition of nitrogen and nitride forming and nitride solubilizing constituents in the materials is adjusted to obtain a desired concentration of nitrogen and nitrides, and (iv) the use of other processes, such as the use of fluxes and filler materials, are used to introduce nitrogen or nitrides to the molten metal forming the weld material, (v) adjusting the shield gas composition to increase carbon gas and carbide species, (vi) adjusting the shield gas composition to decrease carbon gas and carbide species, (vii) adjusting the composition of carbon, carbide forming and carbide solubilizing constituents in the materials to obtain a desired concentration of carbon and carbides, and (viii) using other processes, such as use of fluxes and filler materials, to introduce carbon or carbides to the molten metal forming the weld material, overlay, buttering or cladding.

After preparing the workpieces (e.g., the metallic bodies that will be joined by the weld material to form the weldment) and materials for welding, for example by shaping and/or cleaning, the welding process can commence and proceed to the point at which a region of molten material is formed between the first metallic body and the second metallic body. This region of molten material includes molten base metal from the first metallic body, molten base metal from the second metallic body, molten weld metal from a welding alloy, and, optionally, one or more molten filler metals.

If a shield gas is present, such as in gas metal arc welding and gas tungsten arc welding, the shield gas is supplied to the region of the molten material and forms a protective gaseous barrier to oxygen, water vapor and other impurities that can reduce the quality of the weld. The shield gas can be supplied by any suitable means. For example, the shield gas can be supplied through a shield gas line leading to a gas nozzle at the end of the welding line where the shield gas is expelled to the welding work zone around the welding arc or the shield gas can be supplied from a separate source and device and be applied to the welding work zone around the welding arc.

As an example of a shield gas, the shield gas can be an inert or semi-inert gas (such as argon or helium) whose composition has been modified to include one or more of from 0 to 5 mol. % nitrogen and from 0 to 25 mol. % $CO_2$ (whether individual gases or a mixed gas). As an example, a nitrogen only shield gas, when used in welding applications (such as automatic gas tungsten arc welding with cold wire (AGTA-CW)) with an ERNiCr-3 welding consumable, forms a weld material that includes MC-type and MX-type precipitates at a volume fraction of up to 0.0175 and that has a composition that includes up to 0.13 wt. % nitrogen.

In the welding work zone around the welding arc, the protective gaseous barrier of the shield gas is in contact with the molten material and nitrogen (either in the form of elemental nitrogen or, due to the high temperatures used in welding, a nitride) or carbon (either in the form of elemental carbon or, due to the high temperatures used in welding, a carbide) from the gaseous barrier is introduced into the molten material. In the molten material and during solidification, the nitrogen (or nitride) and/or carbon (or carbide) remains as nitrogen/carbon or reacts with nitride/carbide forming species in the molten metal to form nitrides/carbides, which themselves then promote carbide (e.g. MC-type) and/or complex carbide/nitride (e.g. MX-type) type particulate as well as contribute to the nitrogen content of the weld material.

Alternatively or concurrently, the amount of nitrogen (or nitride) or carbon (or carbide) material in the weld material can be controlled by the composition of nitrogen (and/or carbon) forming and nitrogen (and/or carbon) solubilizing constituents in the materials of one or more of the first metallic body and the second metallic body and the weld metal of the welding alloy. The amount of nitrogen and nitrides (and/or carbon and carbides) can be influenced by adding nitrogen/nitride (and/or carbon/carbide) forming elements or adding elements that increase or impede solubility of nitrogen or nitride promoting elements (and/or carbon or carbide promoting elements). As examples, Ti and Al can be used as nitrogen/nitride forming elements, and Mn can be used as an element to promote the formation of nitrogen or nitrides. These two types of additions can be used singly or in combination to balance the desired effect on the amount and distribution of nitrogen and the carbide (e.g. MC-type), nitride and/or complex carbide/nitride (e.g. MX-type) type particulate, as well as contribute to the nitrogen content of the weld material. For example, one or both of the first metallic body and the second metallic body can have a composition in which the nitrogen content and/or the nitride content has been modified. As another example, one can use measured additions of nitrogen/nitrides during primary/secondary melt processing, such as during VIM melting or a pressurized electroslag remelting process (P-ESR). The analogous situation can be arrived at for carbon content and/or carbide content by using carbon/carbide forming elements and/or processes. For example, carbon/carbide forming elements can be incorporated into welding supplies, such as weld wire, during the VIM melting of the material.

As a further example, the nitrogen content in weld metal of the welding consumable, for example ERNiCr-3 weld metal, can be modified to include nitrogen and/or nitrides by, for example, nitriding the weld metal or by coating the weld metal. Carbon content can be similarly adjusted by, for example, carbiding the weld metal or by coating the weld metal. To nitride or carbide the weld metal, one can expose conventional weld metal to a nitrogen/carbon containing atmosphere at temperature and/or pressure to nitride/carbide the weld metal and form a nitrogen enriched/carbon enriched surface zone in the weld metal. This nitrided/carbided weld metal can then be used as a welding consumable in a welding process by which the nitride/carbide material of the weld metal is added to the region of molten material. Varying the amount of nitriding/carbiding of the weld metal thereby modifies the amount of nitrogen/carbon in the composition of the molten material. Certain flux-based or powder core products could also be modified/created to similar effect.

Alternatively or concurrently, the amount of nitrogen (or nitride) material in the weld material can be controlled by the composition of nitrogen, nitride forming and nitride solubilizing constituents in the materials of the welding aides used in the welding process. Similarly, the amount of carbon (or carbide) material in the weld material can be controlled by the composition of carbon, carbide forming and carbide solubilizing constituents in the materials of the welding aides used in the welding process. Examples of welding aides include fluxes and fillers. For example, in shielded metal arc welding (SMAW) with an ERNiCrFe-3 welding consumable, when the flux is heated and flows it contacts the region of molten material and forms a protective barrier to oxygen, water vapor and other impurities that can reduce the quality of the weld. Although the flux does not mix with the molten material, at the interface of flux and molten material the constituents from the flux can enter into the molten composition. This can occur when there is sufficient driving force for such constituents to cross the flux-molten material interface, such as the high temperatures used in welding or the chemical potentials of the molten material and the flux. If one or more additive is used, such as nitride powders, carbon powders, nitride forming elements, carbide forming elements, and coatings that generate nitrogen gas and/or carbon gas during welding, the additives melt and their content contributes to the content of the molten material. Modifying the nitrogen, nitrides, nitride forming and nitride solubilizing, carbon, carbides, carbon forming and carbide solubilizing content of the fillers, by for example modifying the composition, nitriding, carbiding, or coating, varies the amount of nitrogen, carbon, nitrides, carbides, nitride forming and nitride solubilizing and carbide forming and carbide solubilizing content in the material and, when the material is used as a consumable in a welding process, modifies the amount of nitrogen and/or carbon in the composition of the molten material.

EXAMPLES: Tables 2 and 3 report results from compositional analysis and mechanical testing on samples with varying amounts of nitrogen in the weld material. The samples were prepared by manufacturing a weldment using AGTA-CW welding and a metallic body of Alloy 600 (UNS06600), a nickel-chromium-iron alloy. The weld beads were deposited in flat position on the Alloy 600 test coupon; producing a multi-layer weld buildup with an approximate geometry of 4 inch (width)×5 inch (length)×1 inch (height). The weld metal of the samples in Tables 2 and 3 was an ERNiCr-3 based weld metal. No additive or flux was used. During the welding process for the samples in Table 2 and 3, argon-mixed shield gas was used that had a nitrogen content that varied between the four samples as follows: a 0 mole percent (mol. %) nitrogen shield gas was used for sample YT0159-0NC, a 1 mol. % nitrogen shield gas was used for sample YT0159-1NC, a 5 mol. % nitrogen shield gas was used for sample YT0159-5NC, and a 20 mol. % nitrogen shield gas was used for sample YT0159-20NC.

The ERNiCr-3 weld metal of the samples in Tables 2 and 3 had been prepared by vacuum melting technique in a three-step melt process including vacuum induction melting (VIM), electroslag remelting (ESR), and vacuum arc remelting (VAR), which results in nitrogen content in the range of 15 ppm to 25 ppm. ERNiCr-3 that has been prepared by vacuum melting techniques is a preferred weld consumable as compared to air melt ERNiCr-3 because the nitrogen and nitride content in vacuum melt ERNiCr-3 is more consistent between samples and also the nitrogen and nitride content is 15 ppm to 25 ppm, which is sufficiently low that control of the nitrogen and nitride content in the weld material can be essentially completely dependent on and controlled by the amount of nitrogen and nitrides added by the user during the welding process, e.g., through control of one or more of the shield gas composition, the composition of nitrogen (and nitride) forming and nitrogen (and nitride) solubilizing constituents in the materials, and other processes such as use of fluxes and additive materials.

TABLE 2

Compositional Analysis of Weld Materials (in weight %)

| Element | Sample YT0159-0NC | Sample YT0159-1NC | Sample YT0159-5NC | Sample YT0159-20NC |
|---|---|---|---|---|
| Al | 0.053 | 0.059 | 0.053 | 0.064 |
| C | 0.053 | 0.053 | 0.055 | 0.051 |
| Co | 0.007 | 0.008 | 0.005 | 0.009 |
| Cr | 20.21 | 20.18 | 20.23 | 20.20 |
| Cu | 0.003 | 0.003 | 0.003 | 0.003 |
| Fe | 1.13 | 1.11 | 1.13 | 1.13 |
| Ga | 0.001 | 0.001 | 0.001 | 0.001 |
| H | 0.00043 * | 0.00086 * | 0.00046 * | 0.0002 * |
| La | <0.001 | <0.001 | <0.001 | <0.001 |
| Mg | <0.001 | <0.001 | <0.001 | <0.001 |
| Mn | 3.29 | 3.30 | 3.29 | 3.31 |
| Mo | 0.004 | 0.004 | 0.004 | 0.004 |
| N | 0.00186 * | 0.060 * | 0.136 * | 0.14 * |
| Na | <0.005 | <0.005 | <0.005 | <0.005 |

TABLE 2-continued

Compositional Analysis of Weld Materials (in weight %)

| Element | Sample YT0159-0NC | Sample YT0159-1NC | Sample YT0159-5NC | Sample YT0159-20NC |
|---|---|---|---|---|
| Nb | 2.34 | 2.31 | 2.33 | 2.34 |
| Ni | 72.4 | 72.4 | 72.3 | 72.3 |
| O | <0.001 * | <0.001 * | <0.001 * | <0.001 * |
| P | <0.005 | <0.005 | <0.005 | <0.005 |
| Pb | <0.001 | <0.001 | <0.001 | <0.001 |
| S | <0.001 | <0.001 | <0.001 | <0.001 |
| Sb | <0.001 | <0.001 | <0.001 | <0.001 |
| Si | 0.11 | 0.11 | 0.11 | 0.12 |
| Ta | — | 0.002 | 0.002 | 0.002 |
| Th | <0.001 | <0.001 | <0.001 | <0.001 |
| Ti | 0.37 | 0.36 | 0.36 | 0.32 |
| V | 0.004 | 0.004 | 0.004 | 0.004 |
| W | 0.015 | 0.015 | 0.004 | 0.032 |

* = average of three measurements

The results for the compositional analysis reported in Table 2 were obtained using standard analytical techniques, such as inductively coupled plasma mass spectrometry (ICP-MS) and combustion techniques in either induction or resistance furnaces. The combustion techniques were used for carbon, hydrogen, nitrogen, oxygen and sulfur. The reported nickel content is based on the balance of the as-measured contents of the other constituents.

Sample YT0159-0NC (prepared using a shield gas with 0 nol.% nitrogen), Sample YT0159-1NC (prepared using a shield gas with 1 mol. % nitrogen), Sample YT0159-5NC (prepared using a shield gas with 5 mol. % nitrogen) and Sample YT0159-20NC (prepared using a shield gas with 20 mol. % nitrogen) were then tested for mechanical properties. Table 3 contains the testing results and, for each sample, reports tensile strength (in ksi), 0.2% yield strength (in ksi), elongation (in % in 4D) (meaning the % elongation was measured in a specimen whose gage length is 4 times its gage diameter) and reduction of area (in %) in both the longitudinal direction and the transverse direction relative to the weld travel direction.

TABLE 3

Tensile Testing of Weld Materials

| Sample | Direction of measurement | Diameter (in.) | Tensile (ksi) | Yield, 0.2% (ksi) | Elongation (% in 4D) | Reduction of Area (%) |
|---|---|---|---|---|---|---|
| YT0159-0NC | longitudinal | 0.247 | 97.0 | 62.5 | 42 | 46 |
| | transverse | 0.246 | 94.0 | 63.0 | 36 | 43 |
| YT0159-1NC | longitudinal | 0.247 | 99.0 | 64.5 | 37 | 51 |
| | transverse | 0.246 | 97.5 | 61.5 | 38 | 42 |
| YT0159-5NC | longitudinal | 0.246 | 104 | 69.0 | 35 | 38 |
| | transverse | 0.246 | 107 | 73.5 | 28 | 38 |
| YT0159-20NC | longitudinal | 0.246 | 102 | 67.5 | 31 | 39 |
| | transverse | 0.246 | 107 | 72.5 | 35 | 40 |

More specifically, the four samples were tested following AWS B4.0 (Standard Methods for Mechanical Testing of Welds) with reference to ASTM E8-15a (Standard Test Methods for Tension Testing of Metallic Materials). The testing was conducted at room temperature at 0.005 in/in/min strain rate until 1.5% total strain and at 0.050 in/in/min crosshead rate thereafter until failure. Each sample consisted of all weld metal (corresponding to the compositions in Table 2) and the test blanks for each sample were ⅝ in×⅝ in×3.5 in, machined to 0.250 in diameter round tensile specimens.

Comparing the mechanical properties of the samples prepared using a shield gas with >0 mol. % nitrogen to the sample prepared using a shield gas with 0 mol. % nitrogen, one can observe the change in mechanical properties as the amount of nitrogen in the shield gas (and, by proxy the amount of nitrogen in the weld material, increase. The changes in tensile strength (absolute and in percentage) are shown in Table 4.

TABLE 4

Comparison of mechanical properties of samples prepared with 1 mol. %, 5 mol. % and 20 mol. % nitrogen shield gas to mechanical properties of as ample prepared with 0 mol. % nitrogen shield gas

| Sample | Direction of measurement | Change in Tensile Strength (ksi/%) | Change in Yield Strength, 0.2% (ksi/%) |
|---|---|---|---|
| YT0159-1NC | longitudinal | 2.0 ksi/2.1% | 2.0 ksi/3.2% |
|  | transverse | 3.5 ksi/3.7% | −1.5 ksi/−2.4% |
| YT0159-5NC | longitudinal | 7.0 ksi/7.2% | 6.5 ksi/10.4% |
|  | transverse | 13.0 ksi/13.8% | 10.5 ksi/16.7% |
| YT0159-20NC | longitudinal | 5.0 ksi/5.2% | 5.0 ksi/8.0% |
|  | transverse | 13.0 ksi/3.8% | 9.5 ksi/15.1% |

Also for comparison, per Annex A of ASME IIC, SFA-5.14, typical mechanical properties of conventional ERNiCr-3 weld metal include: tensile strength of 80 ksi. Also for comparison, MIL spec equivalent weld material (EN82H), MIL-E-21562, has a minimum tensile strength of 80 ksi and a minimum elongation of 30%, and annealed UNS N06600 (ASTM B166/168), which has tensile strength and elongation values consistent with EN82H, has a minimum yield strength (0.2% offset) of 35 ksi. Comparing properties of the as-tested inventive samples to the properties of the comparative conventional sample, the as-tested inventive samples displayed an improvement in tensile strength of 14.0 ksi to 22.0 ksi (corresponding to an improvement of 17.5% to 33.8%), in 0.2% yield strength of 26.5 ksi to 38.5 ksi (corresponding to an improvement of 75.7% to 110%), and a change in elongation of −2% to +12% (corresponding to a decrease of 6.7% to an increase of 40.0%)

Figure 3A:
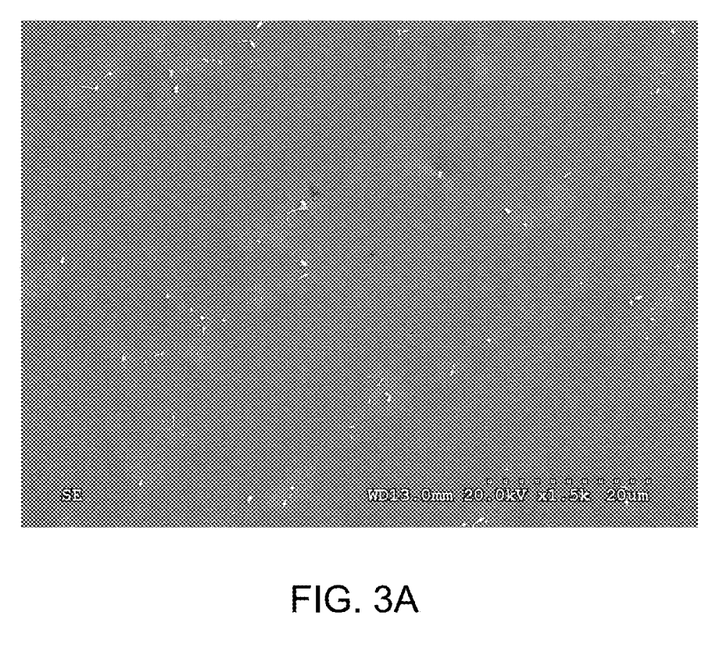
FIGS. 3A-H are a series of SEM micrographs of ERNiCr-3 weld material prepared using a shield gas with varying amounts of nitrogen content.
Figure 3B:
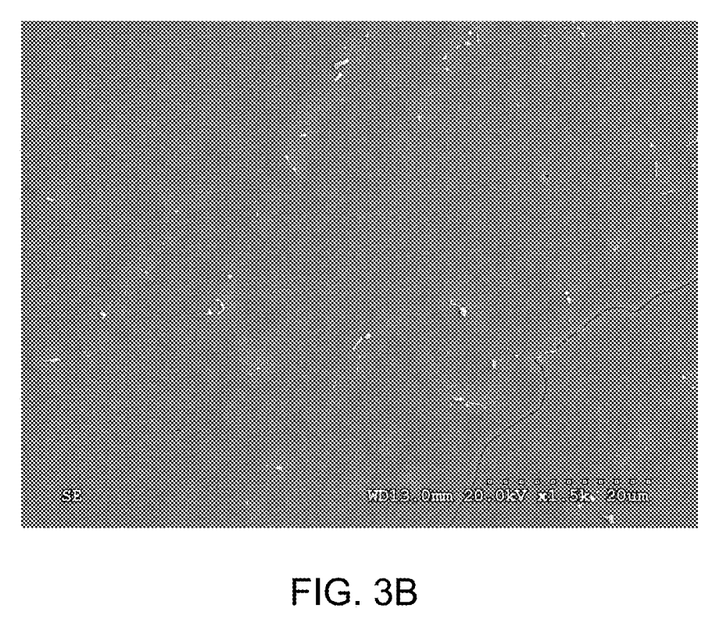
Figure 3C:
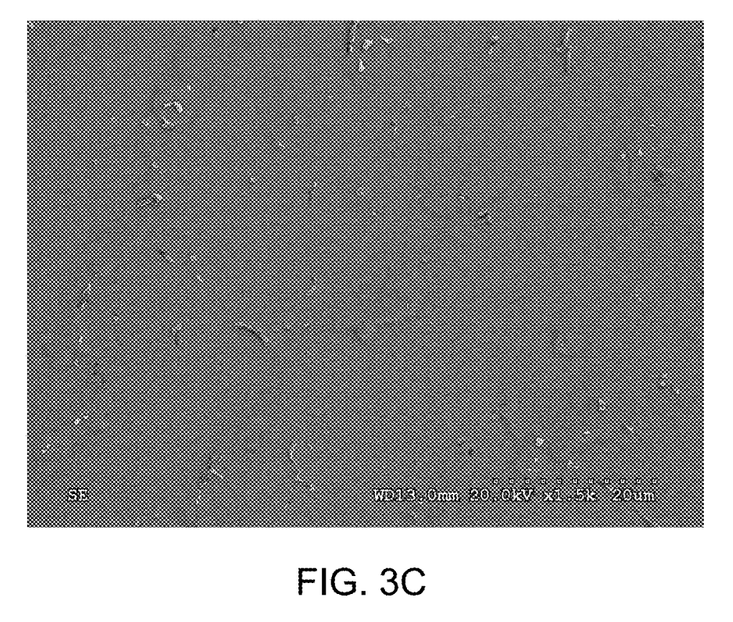
Figure 3D:
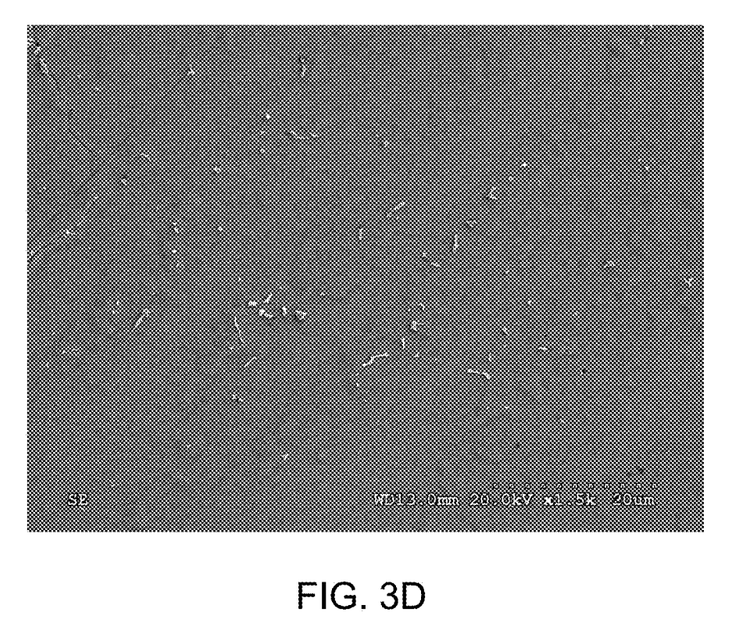
Figure 3E:
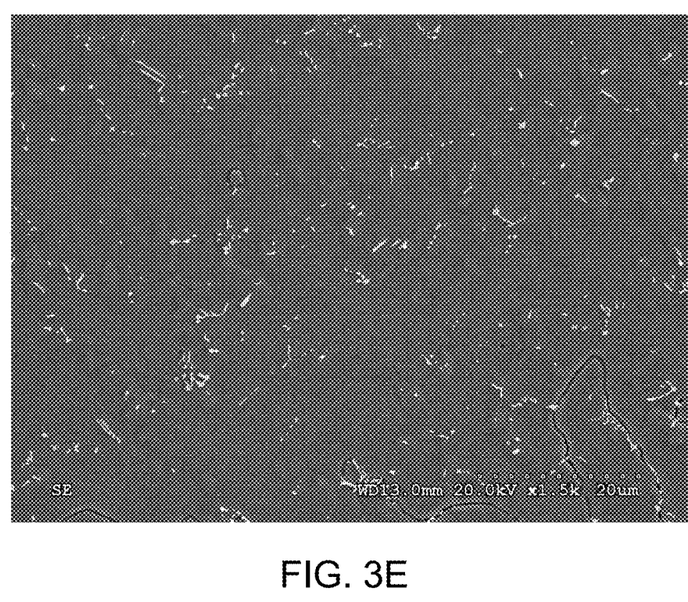
Figure 3F:
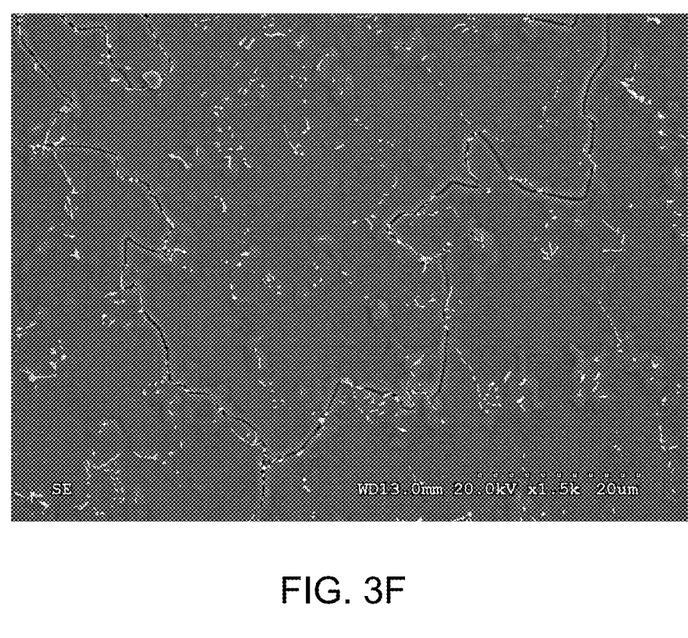
Figure 3G:
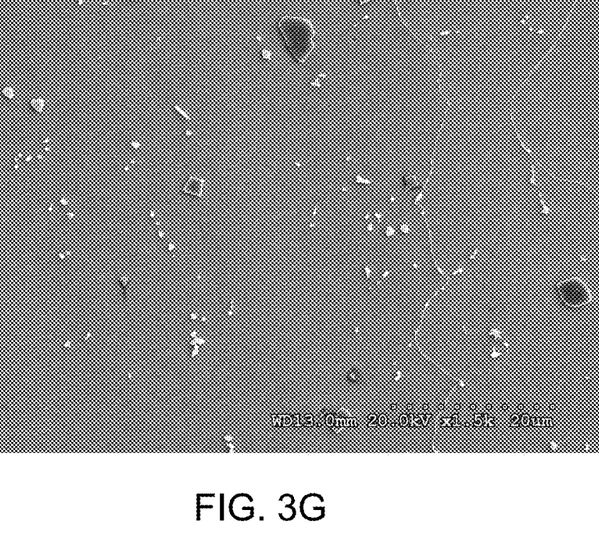
Figure 3H:
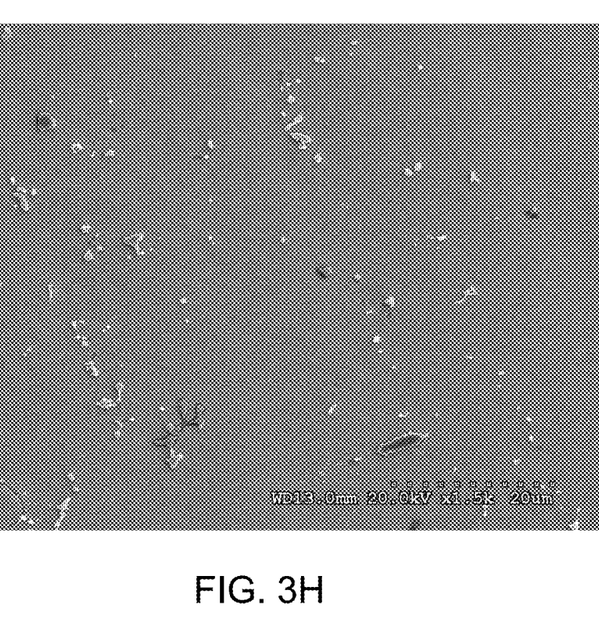

FIG. 3 contains a series of scanning electron micrographs taken at 20 kV and 1500× magnification showing the microstructure of samples of weld material prepared using a shield gas (i) containing 0 mol. % nitrogen at two locations (FIGS. 3A-B); (ii) containing 1 mol. % nitrogen at two locations (FIGS. 3C-D); (iii) containing 5 mol. % nitrogen at two locations (FIGS. 3E-F); and (iv) containing 20 mol. % nitrogen at two locations (FIGS. 3G-H). FIGS. 3A-H show features similar to those shown and described with respect to FIG. 2, although with differing phase volume of precipitates as the amount of nitrogen present during the welding process was varied. As evident in the SEM micrographs, the increased nitrogen content of the weld shielding gas and the resultant weld material (see Table 2) resulted in noticeable increases in MC- and MX-phase volume; both from increased distribution and size. The corresponding improvements to material strength can also be attributed to these precipitation increases, where such secondary phases are known to impede the motion of dislocations through crystallographic structure of the material. Only subtle differences in mechanical properties and volume fraction precipitates were noted between the 5 mol. % and 20 mol. % (in the mixed gas) nitrogen samples, however, likely due to the solubility limit of the ERNiCr-3 weld material (i.e., bulk nitrogen content of 1300-1400 ppm (in the weld metal).

In another example, welds formed of alloys of ERNiCr-3/EN82H were investigated in which the nitrogen and carbon contents varied as follows: 20-1400 ppm nitrogen and nominally 0.03 wt. % carbon or nominally 0.05 wt. % carbon. The welds materials were investigated for tensile properties in both the longitudinal direction and the transverse direction relative to the weld travel direction. Table 5 presents the results of these investigations and, for each sample, reports tensile strength (in ksi) and 0.2% yield strength (in ksi),

TABLE 5

Tensile Testing of Weld Materials Based on ERNiCr-3/EN82H Alloys with Varying N and C Content

| | | | Longitudinal Tensile | | | | Transverse Tensile | | | |
|---|---|---|---|---|---|---|---|---|---|---|
| Sample | C (wt. %) | N (ppm) | Tensile (ksi) | Yield, 0.2% (ksi) | Elongation (% in 4D) | Reduction in Area (%) | Tensile (ksi) | Yield, 0.2% (ksi) | Elongation (% in 4D) | Reeducation in area (%) |
| YT0159 0N | 0.053 | 19 | 97 | 62.5 | 42 | 46 | 94 | 63 | 36 | 43 |
| YT0159 0.2N | 0.050 | 200 | 96.5 | 63.5 | 39 | 52 | 97 | 62 | 45 | 58 |
| YT0159 0.4N | 0.050 | 310 | 97.5 | 62.5 | 37 | 53 | 97 | 61 | 40 | 46 |
| YT0159 1N | 0.053 | 600 | 99 | 64.5 | 37 | 51 | 97.5 | 61.5 | 38 | 42 |
| YT0159 5N | 0.055 | 1300 | 104 | 69 | 35 | 38 | 107 | 73.5 | 28 | 38 |
| YT0159 20N | 0.051 | 1400 | 102 | 67.5 | 31 | 39 | 107 | 72.5 | 35 | 40 |
| B8142 0N | 0.030 | 130 | 89.5 | 57.5 | 37 | 60 | 93 | 59.5 | 40 | 49 |
| B8142 0.2N | 0.030 | 275 | 95.5 | 58 | 44 | 59 | 100 | 65.5 | 39 | 54 |
| B8142 0.4N | 0.028 | 345 | 95.5 | 57.5 | 37 | 52 | 94 | 57.5 | 41 | 54 |
| B8142 1N | 0.027 | 570 | 95 | 58 | 44 | 54 | 97.5 | 59.5 | 41 | 47 |
| B8142 5N | 0.029 | 960 | 98.5 | 60.5 | 39 | 48 | 101 | 62.5 | 37 | 41 |

In the above results in Table 5, the carbon content of the samples did not vary the carbon outside of selecting two wire heats with a different carbon contents—a high carbon content of 0.05 wt. % and low carbon content of 0.03 wt. %). Comparing data from samples with equivalent or nearly equivalent nitrogen content can be used to isolate carbon effects in these samples. In this case and using the data from Table 5, comparing values for mechanical properties of sample YT0159 1N to sample B8142 1N shows the effect of varying carbon content (0.05 wt. % C for YT0159 1N; 0.03 wt. % C for B8142 1N) with nominally constant nitrogen content in the shield gas or 1 mol % N in mixed gas. For these samples, testing reported in Table 5 shows a reduction in longitudinal mechanical properties between the samples, but the transverse mechanical properties are nominally constant. In another case and using the data from Table 5, comparing values for mechanical properties of sample YT0159 0.4N to sample B8142 0.4N shows the effect of varying carbon content (0.05 wt. % C for YT0159 0.4N; 0.03 wt. % C for B8142 0.4N) with nominally constant nitrogen content in the shield gas or 0.4 mol % N in mixed gas. For these samples, testing reported in Table 5 shows a nominal constant value in longitudinal mechanical properties between the samples, but the transverse mechanical properties are show a reduction in values for the low carbon sample (0.03 wt. % C) as compared to the high carbon sample (0.05 wt. % C).

One conclusion from the above investigation is that nitrogen has a minimal effect on tensile and yield strength and that carbon has a stronger effect than nitrogen on tensile and yield strength. Additionally, the difference in solubility of nitrogen in the low carbon sample B8142 5N as compared to the sample YT0159 5N for the same amount of nitrogen in the shield gas is noteworthy and suggests/confirms that starting material content, most notably of carbon (and to a lesser extent Ti and Nb), will have a direct influence on nitrogen solubility during and after the welding/melting process(es). These effects are also anticipated via non-equilibrium computational thermodynamic modeling and are expected to be observable during primary/secondary melting processes of bulk material production or product manufacturing. This provides insight to the interdependence of carbon and nitrogen content and the consideration required to achieve target material composition; both in original product form or throughout manufacturing.

Also, one can compare the mechanical properties of various samples to observe the effect of varying nitrogen content in the shield gas for both nominal 0.05 wt. % C and nominal 0.03 wt. % C samples using a shield gas with 5 mol. % nitrogen (the 5N samples) to the corresponding samples prepared using a shield gas with 0 mol. % nitrogen, one can observe the change in mechanical properties as the amount of nitrogen in the shield gas (and, by proxy the amount of nitrogen in the weld material, increase. The changes in tensile strength (absolute and in percentage) are shown in Table 6.

TABLE 6

Comparison of mechanical properties of samples prepared with 5 mol. % nitrogen shield gas to mechanical properties of a sample prepared with 0 mol. % nitrogen shield gas

| Sample | Direction of measurement | Change in Tensile Strength (ksi/%) | Change in Yield Strength, 0.2% (ksi/%) |
|---|---|---|---|
| YT0159-5NC | longitudinal | 7.0 ksi/7.2% | 6.5 ksi/10.4% |
|  | transverse | 13.0 ksi/13.8% | 10.5 ksi/16.7% |

TABLE 6-continued

Comparison of mechanical properties of samples prepared with 5 mol. % nitrogen shield gas to mechanical properties of a sample prepared with 0 mol. % nitrogen shield gas

| Sample | Direction of measurement | Change in Tensile Strength (ksi/%) | Change in Yield Strength, 0.2% (ksi/%) |
|---|---|---|---|
| B8142-5NC | longitudinal | 9.0 ksi/10.1% | 3.0 ksi/5.2% |
|  | transverse | 8.0 ksi/8.6% | 3.0 ksi/5.0% |

One conclusion from the above investigation is that an increase in nominal material carbon content will increase the anticipated range of material strength within the respective boundaries of nitrogen solubility (as influenced by the weld/melt process) or, alternately, a decrease in nominal material carbon content will restrict the anticipated influence of material strength due to varied nitrogen content.

Although the present invention has been described in connection with embodiments thereof, it will be appreciated by those skilled in the art that additions, deletions, modifications, and substitutions not specifically described may be made without departure from the spirit and scope of the invention as defined in the appended claims. For example, although described in relation to weld material, the principles, compositions and processes described herein can also apply to base materials and their compositions and can be implemented in the alloying processing of base materials.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

What is claimed is:
1. A method of fusion welding, comprising:
  forming a region of molten material between a first metallic body and a second metallic body, wherein the molten material includes molten base metal from the first metallic body, molten base metal from the second metallic body, weld metal from a welding alloy, and, optionally, one or more molten additive material;
  modifying at least one of a nitrogen content of the molten material and a nitride content of the molten material;
  coalescing the molten material; and
  solidifying the molten material to form a weld material, wherein the weld material joins the first metallic body to the second metallic body to form a weldment, and wherein the solidified weld material has a composition including:
    Cr 18.0 to 22.0 wt. %,
    Mn 2.5 to 3.5 wt. %,
    Fe 1.0 to 3.0 wt. %,
    Nb 2.0 to 3.0 wt. %,
    N 200 ppm to 1500 ppm,
    C 0.03 to 0.1 wt. %,
    Ti up to 0.75 wt. %,
    Si up to 0.25 wt. %, and
    Ni equal to or greater than 67 wt. %.
2. The method of claim 1, wherein a microstructure of the solidified weld material includes a plurality of precipitates, wherein the plurality of precipitates include a plurality of metal carbide precipitates and a plurality of metal carbide/nitride precipitates, and wherein, for a carbon content of 0.05 wt. %, a volume fraction of the plurality of precipitates is 0.003 or more for nitrogen in the range of 200 ppm to 1500 ppm.

3. The method of claim 1, wherein modifying the nitrogen content includes supplying a shield gas to blanket the region of molten material through the step of solidifying and adjusting a content of a shield gas to include 1 mol. % to 20 mol. % nitrogen.

4. The method of claim 1, wherein modifying the nitrogen content includes adding nitrogen to the region of molten material.

5. The method of claim 1, wherein modifying the nitride content includes adding one or more of a nitride and a nitride forming element to the region of molten material.

6. The method of claim 1, wherein modifying the nitride content includes adjusting solubility of nitride in the region of molten material.

7. The method of claim 6, wherein adjusting solubility includes adding an element to the region of molten material that increases the solubility of nitride or adding an element to the region of molten material that reduces the solubility of nitride.

8. The method of claim 1, wherein modifying the nitrogen content includes using a welding aide having a nitrogen content adjusted to 5 mol. % to 20 mol. %.

9. The method of claim 8, wherein the welding aide is a flux or a powder.

10. The method of claim 1, wherein nitrogen is present from 600 ppm to 1400 ppm.

11. The method of claim 1, wherein the first metallic body and second metallic body are dissimilar metals.

12. The method of claim 4, wherein nitrogen is added to the region of molten material by a flux.

13. The method of claim 4, wherein nitrogen is added to the region of molten material by a filler material.

14. The method of claim 1, wherein a microstructure of the solidified weld material includes a plurality of precipitates, wherein the plurality of precipitates include a plurality of metal carbide/nitride precipitates, and
wherein, for a carbon content of 0.05 wt. %, a volume fraction of the plurality of precipitates is 0.003 or more for nitrogen in the range of 200 ppm to 1500 ppm.

15. The method of claim 1, wherein a microstructure of the solidified weld material includes a plurality of precipitates, wherein the plurality of precipitates include a plurality of metal carbide precipitates, and
wherein, for a carbon content of 0.05 wt. %, a volume fraction of the plurality of precipitates is 0.003 or more for nitrogen in the range of 200 ppm to 1500 ppm.

16. The method of claim 1, wherein the composition of the solidified weld material has a carbon content of 0.03 to 0.06 wt. %.

* * * * *